Jan. 19, 1971  J. L. OTSTOT  3,555,942
TAILSTOCK
Original Filed Dec. 8, 1964  8 Sheets-Sheet 2

INVENTOR.
JAMES L. OTSTOT,
BY
Linton and Linton
ATTORNEYS.

Jan. 19, 1971   J. L. OTSTOT   3,555,942
TAILSTOCK
Original Filed Dec. 8, 1964   8 Sheets-Sheet 5

FIG. 3.

INVENTOR.
JAMES L. OTSTOT,
BY
ATTORNEYS

Jan. 19, 1971  J. L. OTSTOT  3,555,942
TAILSTOCK
Original Filed Dec. 8, 1964  8 Sheets-Sheet 6
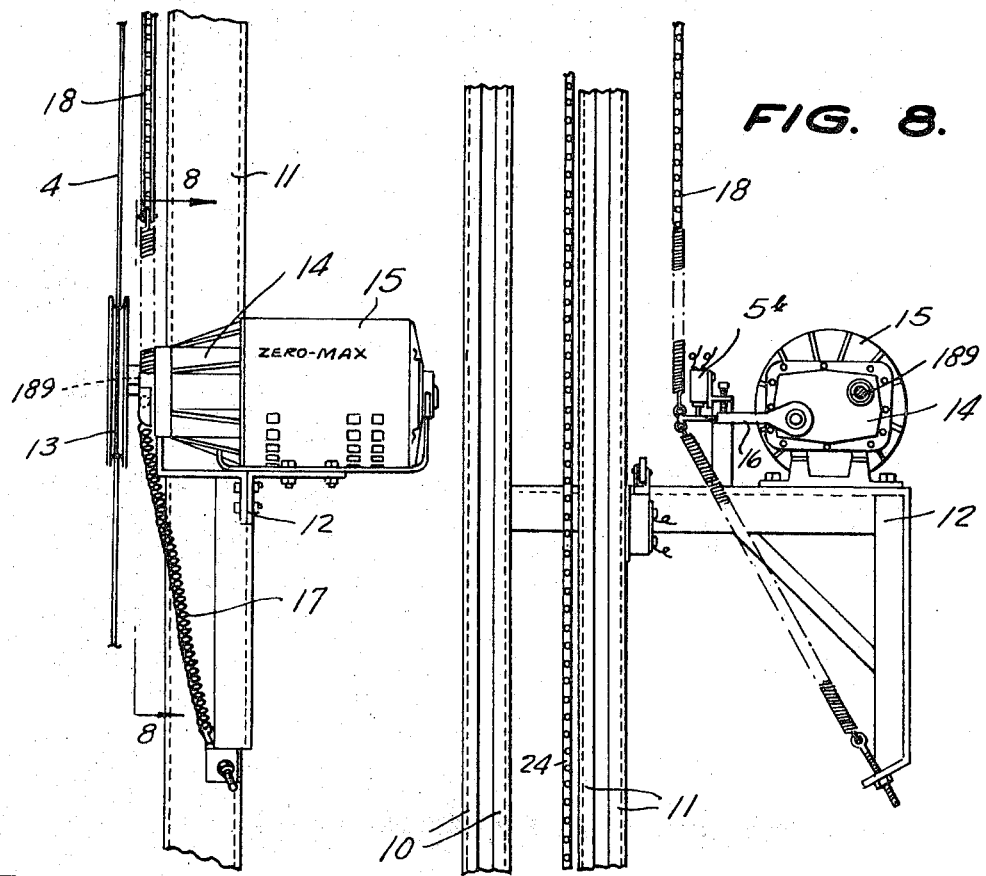
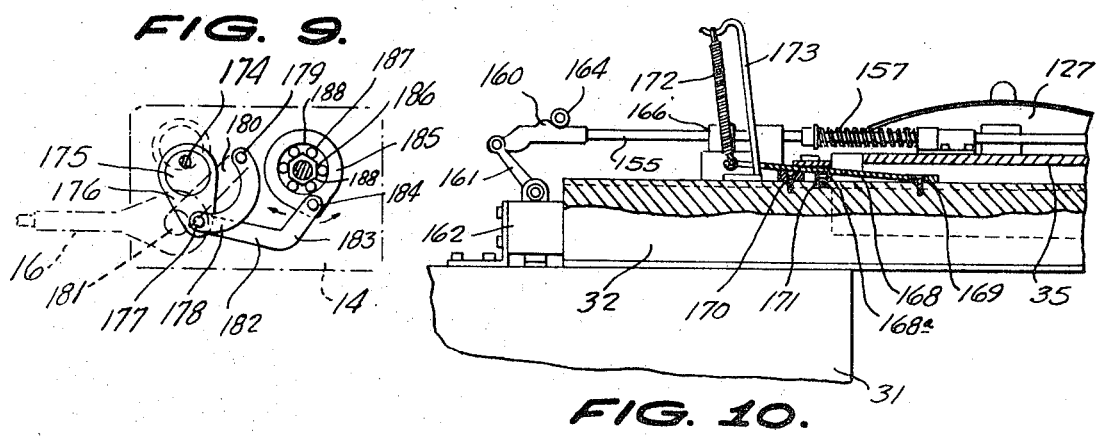
INVENTOR.
JAMES L. OTSTOT,
BY
*Linton and Linton*
ATTORNEYS.

Jan. 19, 1971  J. L. OTSTOT  3,555,942
TAILSTOCK

Original Filed Dec. 8, 1964  8 Sheets-Sheet 7

INVENTOR.
JAMES L. OTSTOT,
BY
Linton and Linton
ATTORNEYS.

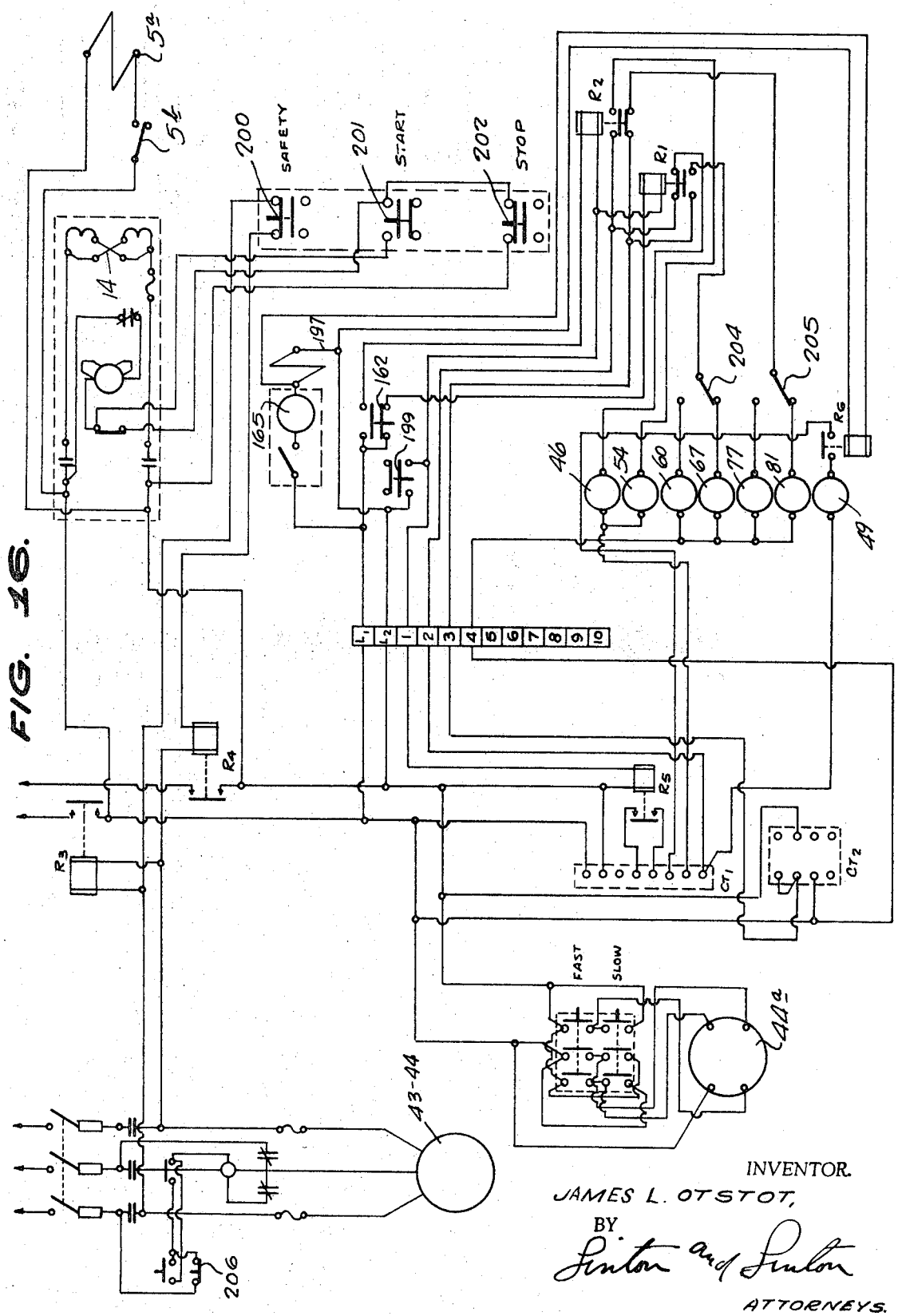

United States Patent Office 3,555,942
Patented Jan. 19, 1971

3,555,942
TAILSTOCK
James L. Otstot, Carlisle, Pa., assignor to Carlisle Tire and Rubber, Division of Carlisle Corporation, a corporation of Delaware
Original application Dec. 8, 1964, Ser. No. 416,796, now Patent No. 3,438,831, dated Apr. 15, 1969. Divided and this application Jan. 8, 1969, Ser. No. 789,821
Int. Cl. B23b 23/00
U.S. Cl. 82—31
1 Claim

ABSTRACT OF THE DISCLOSURE

The present machine is for forming convolutions of one or more strands of material around and along an extended tubular member supported and rotated by a quickly detachable selectively driven and automatically stopped mandrel on the machine and includes means for guiding said strand material to said tubular member in coordination with the rotation of said mandrel, feeds at least one of said strands at a predetermined rate while automatically compensating for any variations in the feeding speed of the strand as well as maintaining a constant tension on the strand being fed, feeds a tape around and over the strand and exposed areas of said tubular member at a proper angle and at controlled speeds to give a uniform spiral pitch and overlapping of the edges of said tape to form a wire reinforced hose and includes a carriage driven in coordination with said mandrel carrying said strands and tape, means for feeding a liquid to the periphery of the tubular member prior to the tape thereon, means for providing a cast to one of said strands and means for preventing said cast strand from pulling out of said casting means.

---

The present application is a divisional application from my copending application, Ser. No. 416,796, filed Dec. 8, 1964, now Pat. No. 3,438,831.

DESCRIPTION

The present invention is concerned with a strand wrapping machine and particularly a machine for wrapping wire and an overlay of tape around and along the length of an extended core.

The principal object of the present invention is to provide a machine for forming convolutions of one or more strands of material around and along an extended cylindrical or tubular member and which machine is capable of wrapping wire in spaced apart coils slightly embedded in and extending along the length of a resilient tube while at the same time applying a liquid to the periphery of said tube and thereafter wrapping a tape around and over the wire and exposed areas of said tube in overlapping spirals to provide a wire reinforced hose.

A further important object of the invention is to provide a machine having a driven mandrel which machine will detachably and rotatably support the mandrel, drive the mandrel at various constant revolutions per minute as desired, stops the rotation of the mandrel automatically, supports the mandrel in such a manner as to prevent its accidental removal from the machine when in use and yet which machine supports the mandrel so that it can be quickly and easily mounted and detached from the machine, as desired.

Another important object of the invention is to provide a machine for forming coils of wire, which machine includes a head for supporting one end of a driven mandrel about which the wire is coiled and which head has a quick release gripper for retaining and releasing the starting end of the wire, which gripper can be operated by one hand of the machine operator.

An equally important object of the invention is to provide a machine for forming coils of wire around an elongated object and which machine includes means for feeding the wire to said object at any given rate as determined by the operator, from a reel of wire, which feed automatically compensates for the variations in speed of the wire when being used and will maintain a constant tension on the wire being fed.

A still further object of the invention is to provide a machine for providing a tape wrapping over and along an elongated object including laminated objects, which tape is fed to the object at the proper angle and speed to give a uniform spiral overlapping to the edges of the tape and with the pitch of the tape wrapping being uniform throughout the length of the object, and the machine can be readily and quickly controlled to vary the feed of said tape to provide the wrapping with any of various different pitches per inch the operator may select.

An equally important object of the invention is to provide a machine for producing wire reinforced hose having an elongated quickly detachable mandrel for supporting the hose while being rotated by a spindle which spindle can have its speed varied either while the spindle is rotating or stationary and stopped and released automatically upon the completion of each wrapping operation in the formation of the hose for a short time to permit the manual rotation of the spindle during that time for any hand operations on the hose.

A still further object of the invention is to provide a wire reinforced hose forming machine having a reel for supporting a large quantity of wire from which the wire is drawn through motor driven wire pull off means and which reel is automatically stopped from rotating when said motor stops and released when said motor is running.

Another important object of the invention is to provide a machine for rotatably supporting and driving a mandrel upon which a wire reinforced hose is to be formed, which machine has a carriage driven in co-ordination with said mandrel along the length of the mandrel at desired speeds and carries wire, tape and liquid feeding means as well as means for providing a cast or curve in the wire being fed to conform to the diameter of the hose as well as means for preventing the wire from pulling back out of said casting means when the wire is cut and said machine also provides automatic means for retaining said carriage at the feed end of the mandrel each time the carriage is returned thereto.

Further objects will be in part obvious and in part pointed out in the following detailed description of the accompanying drawings, in which:

FIG. 3 is a further enlarged front elevation, of the drive portion of the machine with its cover removed and which view is taken on line 3—3 of FIG. 2.

FIG. 7 is a cross-sectional view taken on line 7—7 of FIG. 1.

FIG. 8 is a sectional view taken on line 8—8 of FIG. 7.

FIG. 9 is a front view of the "Zero-Max" control forming part of the present machine with its cover removed and with its casing and speed control lever shown in dotted lines.

3,555,942

Figure 2:
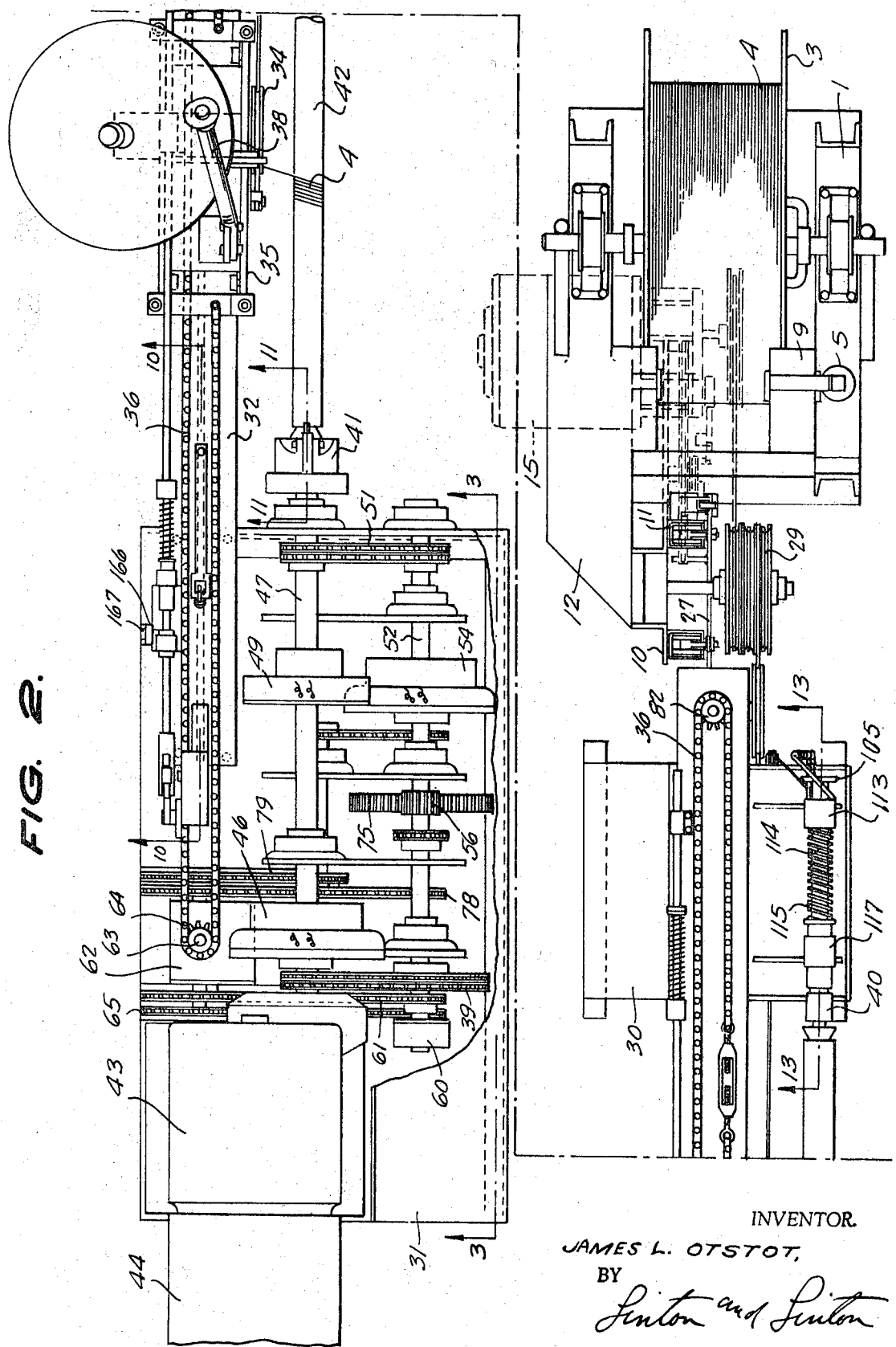
FIG. 2 is an enlarged top view, partly broken away, of the machine with the drive portion shown at top and the feed portion shown at the bottom of the figure.

FIG. 10 is a sectional view taken on line 10—10 of FIG. 2.

Figure 11:
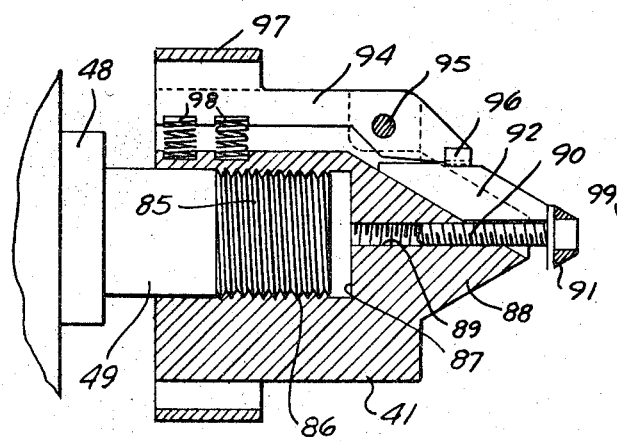

FIG. 11 is an enlarged detail view taken on line 11—11 of FIG. 2.

Figure 12:
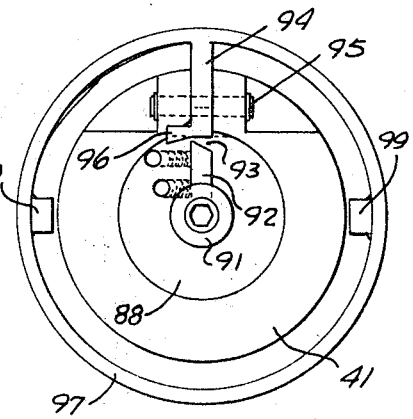

FIG. 12 is an end view of the wire holding head shown in FIG. 11.

Figure 13:
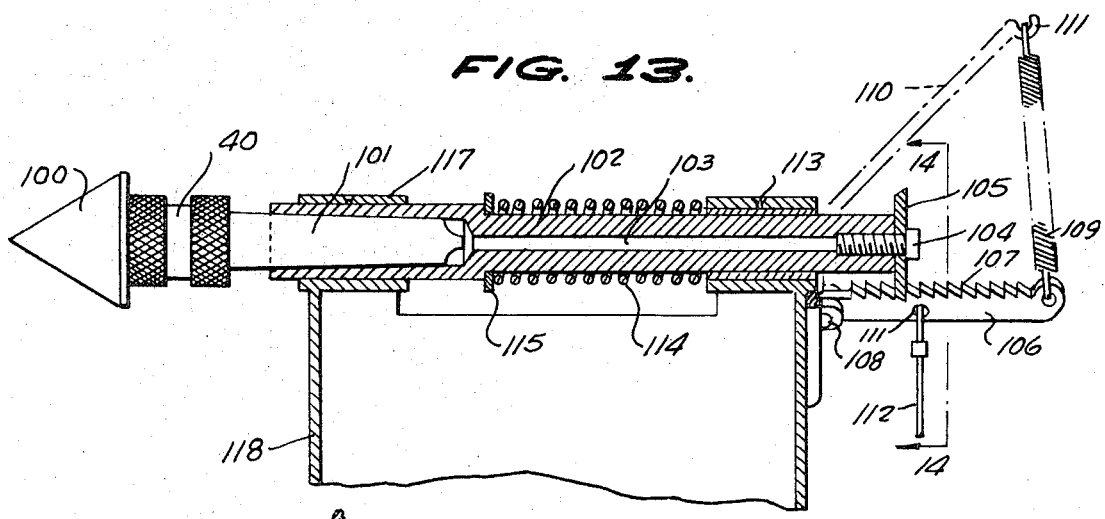

FIG. 13 is an enlarged sectional view taken on line 13—13 of FIG. 2.

Figure 14:
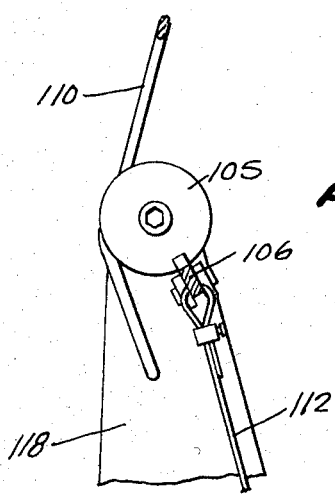

FIG. 14 is an end cross-sectional view taken on line 14—14 of FIG. 13.

FIG. 15 is a rear view, on a smaller scale, of the portion of the machine behind FIG. 13.

And FIG. 16 is a wiring diagram for the machine.

Referring now more particularly to the accompanying drawings, wherein like and corresponding parts are shown by similar reference characters, numeral 1 indicates a frame rotatably supporting roller pairs 2 rotatable supporting the axle of a reel 3 upon which is wound a supply of wire 4. An air cylinder 5 is controlled by solenoid valve 5a controlled by micro-switch 5b and is connected to a source of air under pressure (not shown). Said air cylinder is also pivotally connected at 5c at one end to said frame with its core rod 6 pivotally connected to a link 7 also pivotally connected at 8 to said frame. Link 7 pivotally supports a brake shoe 9 positioned for at times engaging the rim of reel 3 for stopping the same.

Two pairs of spaced apart upright rails 10 and 11 are fixedly mounted adjacent frame 1 and an L-shaped support 12 extends laterally from said rails and is fixedly connected thereto.

A pulley 13 is fixedly connected to the output shaft of a conventional "Zero-Max" drive as produced by the Zero-Max Company of Minneapolis, Minn., which drive is shown in FIG. 9 and is described more in detail hereinafter. An electric motor 15 is fixedly connected to the input shaft of said drive for rotating the same. The speed control lever 16 of said drive has a spring 17 connected thereto, which spring is also connected to support 12. A link chain 18 is also connected to lever 16 and extends over a sprocket 20 and has a weight 19 at its free end.

Sprocket 20 is fixedly connected to a larger sprocket wheel 21 over which extends a second link chain 24, which passes under pulley 25 supporting weight 26. Chain 24 has one end connected to arm 23 extending from projection 22 fixedly mounted on rails 10 and 11 and which arm also rotatably supports sprocket wheel 21.

The other end of chain 24 is connected to slide plate 27 sliding on rails 10 and 11 and rotatable carrying multiple groove pulley 28. A second multiple groove pulley 29 is mounted for rotation at the top of said rails.

A support housing 30 is fixedly mounted adjacent rails 10 while a second housing 31 for the drive and control mechanism is also fixedly mounted, but spaced from housing 30 by an H-beam 32 fixedly connected to and extending horizontally between said housings.

A pulley 33 is rotatably mounted on one end of said H-beam, while a further pulley 34 is rotatably mounted on carriage 35 slidably mounted on the top of said H-beam.

A link chain 36 is connected at its opposite ends to said carriage and extends lengthwise of said H-beam.

A liquid supply device 37 is pivotally mounted on said carriage while a tape guile 39a is also mounted on said carriage for receiving tape 39 from a supply reel 38 rotatably mounted on said carriage.

A spring loaded tail center 40 is rotatably mounted on housing 30 while a wire end gripping head 41 is rotatably mounted on housing 31. An elongated cylindrical mandrel 42 is mounted on and extends between said tail center and gripping head.

An electric motor 43 is connected to a conventional Reeves Motor Drive 44 which has an electric control motor 44a. A shaft 47 is fixedly connected to the output shaft of said Reeves Motor Drive and has a double sprocket 45 and an electric clutch 46 connected thereto while shaft 47 also extends through bearings 48. Shaft 47 is also connected to an electric brake 49 and sprocket wheels 50 having a pair of link chains 51 extending therearound and which chains 51 also extend around sprockets 55 connected to shaft 52 extending through bearings 53.

Shaft 52 is connected to electric clutch 54, gear 56, sprocket 57, double sprocket 58, and electric clutch 60 for sprocket 60a. A pair of link chains 59 extend around and connect sprockets 45 and 58. A link chain 61 extends around and connect sprocket 60a to the drive shaft of a miter box 62. Said miter box has two pair of side sprockets (not shown) with each pair on an opposite side of the miter box drive shaft. The output shaft 63 of said miter box has a sprocket 64 fixedly mounted thereon with link belt 36 extending therearound.

A link belt 65 connects one of said miter box sprockets with sprocket 66 connected to electric clutch 67 connected to shaft 68 which extends through bearings 69 and has a sprocket 70 fixedly connected thereto. Sprocket 70 is also connected by link belt 71 to sprocket 57.

A link belt 72 connects sprockets 73 and 74 while sprocket 73 is fixedly mounted on shaft 75 and sprocket 74 is fixedly mounted on shaft 74a. Gear wheel 74b is fixedly mounted on 74a and meshes with gear 56.

Electric clutch 77 connected to shaft 74a has a pinion 76 connected to said miter box by link chain 78. Said miter box is also connected by link chain 79 to sprocket 80 connected to electric clutch 81. Clutch 81 is also connected to shaft 75.

Figure 4:
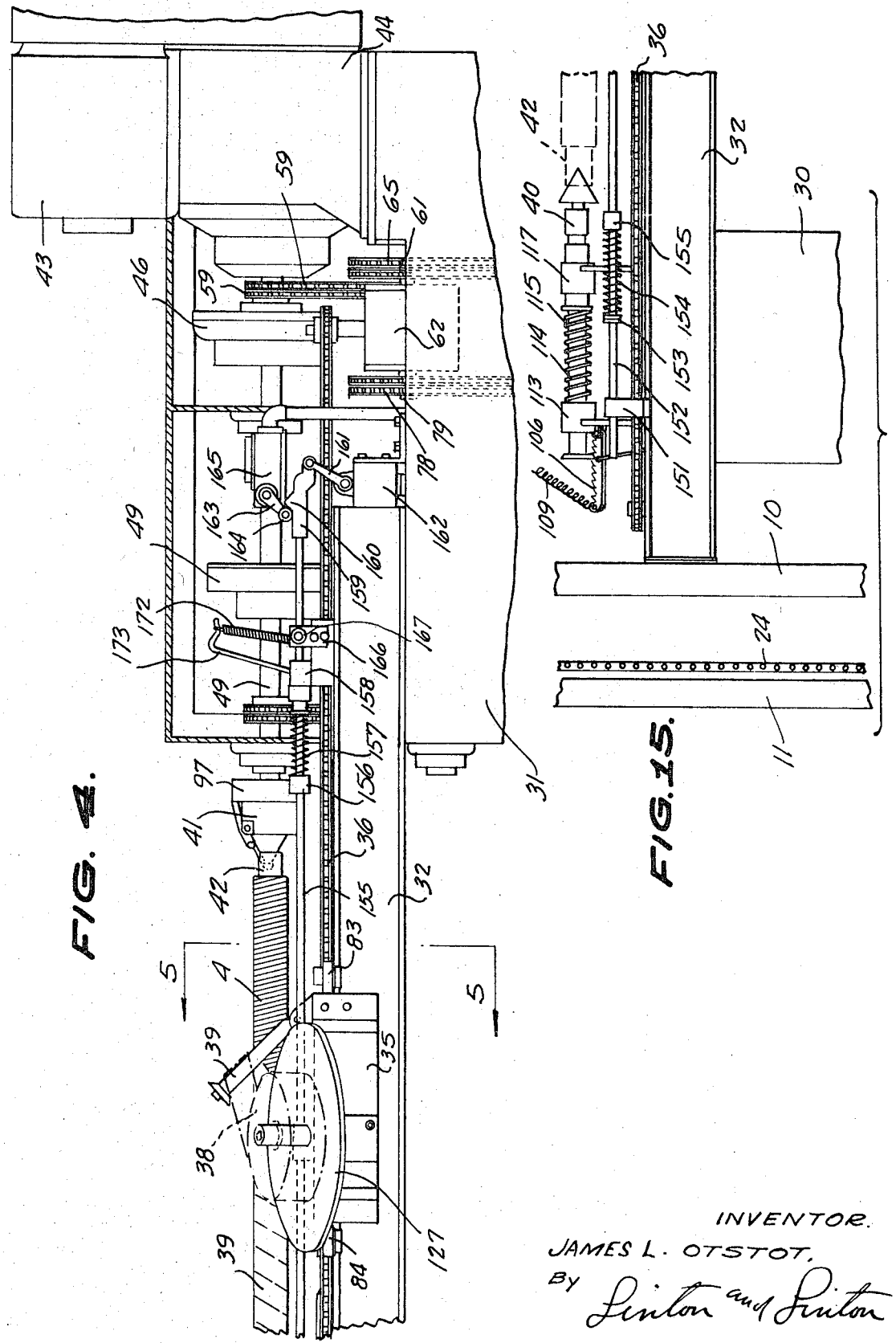
FIG. 4 is an enlarged rear view of the upper drive portion of the machine.
Figure 5:
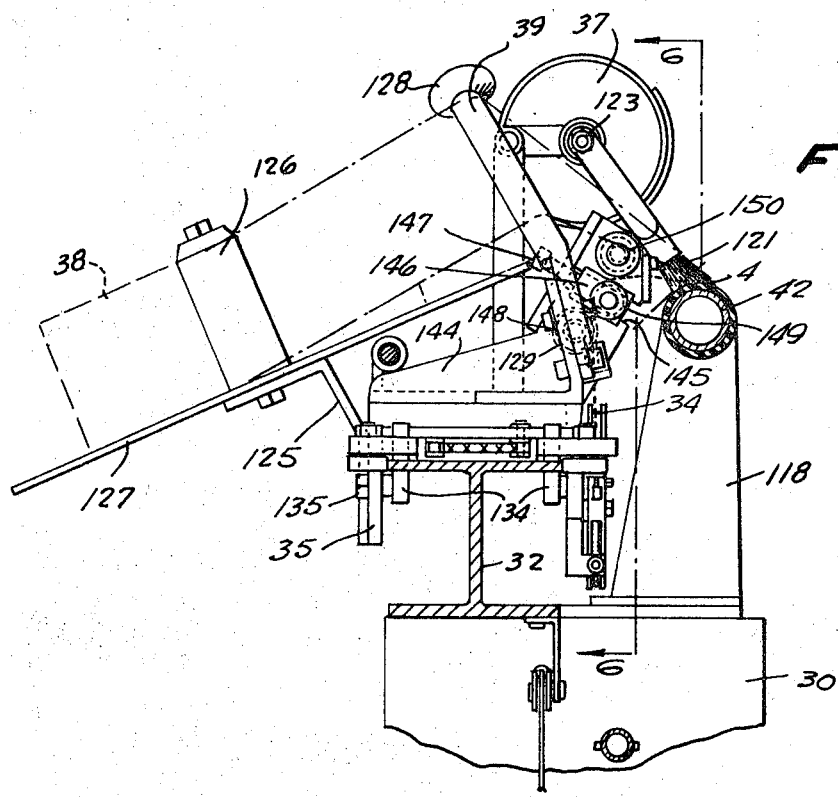
FIG. 5 is a cross-sectional view taken on line 5—5 of FIG. 4.
Figure 6:
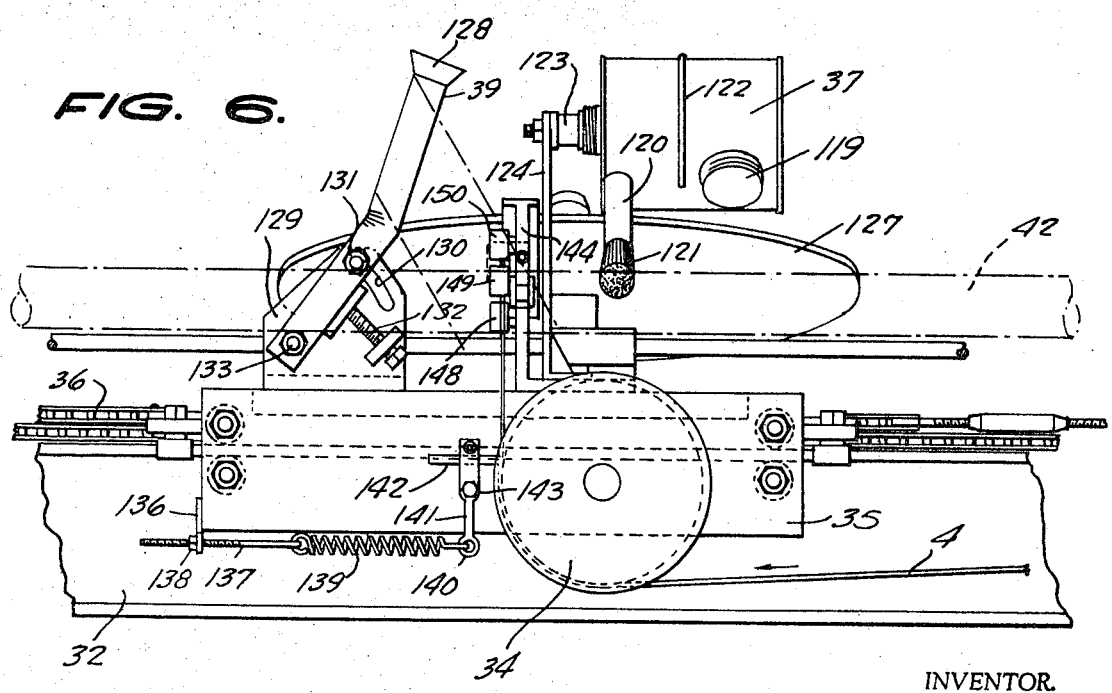
FIG. 6 is a front view taken on line 6—6 of FIG. 5.

A sprocket 82 is rotatably mounted on said H-beam 32 and link belt 36 extends therearound while the opposite ends 83 and 84 of said link belt 36 are attached to carriage 35 as shown in FIG. 4.

As shown in FIG. 11 shaft 47 is threaded at end 85 and is in threaded engagement with the threads 86 in axial recess 87 of head 41. Said head has a cone shaped end 88 for receiving a similarly shaped end in mandrel 42 and a threaded axial bore 89 with bolt 90 in threaded engagement therewith. A washer 91 is positioned beneath the head of said bolt while a key 92 is positioned in slot 93 in head 41 for extending into a slot in the end of said mandrel.

Lever 94 is also in slot 93 and pivotally connected by pin 95 to said head. Said lever has a lateral projection 96 on one end above key 92 and a ring 97 on its other end. Springs 98 are positioned between head 41 and ring 97 tending to hold projection 96 against said key. Stops 99 on ring 97 prevent sidewise movement of said ring.

Said tail center 40 has a cone shaped end 100 rotatably mounted therein for fitting in a similarly shaped recess in mandrel 42 for cooperating with cone shaped end 88 of head 41 for rotatably supporting said mandrel therebetween. Said tail center further has a tapered tail stock 101. A tube 102 has an axial bore 103 threaded at one end with a bolt 104 in threaded engagement therewith. A disc 105 having a slanting periphery is positioned between said tube and the head of bolt 104. A ratchet bar 106 has teeth 107 along one edge thereof for receiving the edge of disc 105. Further bar 106 is pivotally connected at one end by pin 108 to support 118 fixedly mounted on housing 30. A spring 109 connects the other end of bar 106 to hook 111 on arm 110 which arm is fixedly connected to support 118. A cable 112 is also connected to bar 106 and to a foot pedal 90 as hereinafter described.

A tubular bearing 113 is fixedly mounted on support 118 with tube 102 slidable extending therethrough and a coil spring 114 surrounds tube 102 between bearing 113 and a washer 115 fixedly carried by said tube. A second tubular bearing 117 is fixedly mounted on support 118 with tube 102 slidably extending therethrough.

Liquid container 37 has a filler cap 119 screwed thereon, a tube 120 extending laterally therefrom with a brush 121 in the end of said tube and a vent tube 122 around and through the periphery thereof. A spring loaded axle 123 is fixedly connected to and extends axially of said container and is rotatably connected to arm 124 extending above and fixedly connected to carriage 35.

An inverted L-shaped arm 125 is also fixedly mounted on carriage 35 and extends thereabove with a supply reel consisting of roller 126 and disc 127 rotatably counted on arm 125 for supporting a roll of tape 38.

Tape guide 39a has a truncated cone shaped washer 128 fixedly mounted on the end thereof while upright plate 129 has a slot 130 through which extends bolt 131 from guide 39a with a nut for holding said guide 39a in various positions along said slot. A stop bolt 132 is in threaded engagement with plate 129 and limits the movement of said guide which in turn is pivotally connected to plate 129 by a nut and bolt 133 extending therethrough.

A pair of rollers 134 ride on the under-side of H-beam 32 and are rotatably carried by axles 135 extending from carriage 35 for retaining said carriage on said H-beam.

A plate 136 extends downwardly from and is fixedly connected to carriage 35 and an eye bolt 137 extends through said plate and has a nut 138 thereon. Spring 139 connects said eye bolt and the eye 140 of a lever 141 pivotally connected by bolt 143 to said carriage. A cog 142 having a 15° slanting end is adjustably carried by lever 141 and positioned for its edge to engage wire 4 on pulley 34 to prevent said wire from being pulled from said carriage by slide 27.

A plate 144 is fixedly mounted on and extends crosswise of said carriage and has a slot 145 therein. A slide 146 is slidably mounted on plate 144 in said slot and a bolt 147 is in threaded engagement with said plate and said slide for adjusting the position of said slide. A grooved roller 148 is rotatably mounted on said plate below said slot while a second grooved roller 150 is rotatably mounted on said plate above said slot. A third grooved roller 149 is rotatably mounted on slide 146 and wire 4 passes upwardly from pulley 34 to roller 148 and sinuously winds therefrom over rollers 149 and 150 to be given a bend or cast to conform to the diameter of mandrel 42. Slide 146 is adjusted to vary said wire cast for different size mandrels.

A bearing 151 is fixedly mounted on H-beam 32 with rod 152 slidably extending therethrough and a disc 153 is fixedly mounted on said rod with coil spring 154 surrounding said rod between said disc and a tubular slide 155 slidably mounted on said rod adjacent said tail center 40. Rod 152 extends lengthwise of H-beam 32 and has a second tubular slide 156 slidably mounted thereon with a second coil spring 157 surrounding said rod between said second slide and a bearing 158 fixedly mounted on said H-beam with rod 152 slidably extending therethrough. A cam 159 is fixedly mounted on the end of rod 152 and has a suitably shaped cam surface 160 on the top thereof. A control lever 161 is pivotally connected to cam 159 and to a limit switch 162 for controlling said switch which is of a double throw snap-lock type for selecting a different set of said clutches.

A control lever 163 has a roller 164 riding on cam surface 160 for being moved thereby and which lever 163 is connected to a time delay switch 165 for operating the same. A bearing 166 fixedly mounted on said H-beam has rod 152 extending therethrough and a bolt 167 in threaded engagement with said bearing and abutting said rod for at times locking said rod against movement.

A spring plate 168 is positioned in the path of carriage 35 and is connected at one end by screw 169 to the top of H-beam 32 adjacent head 41 and extends longitudinally of said H-beam. Compression springs 168a are mounted on H-beam 32 below plate 168 and a stop 170 is fixedly mounted on said H-beam beneath said spring plate while an inverted U-shaped stop 171 fixedly mounted on said H-beam extends above said spring plate. A coil spring 172 connects the free end of said spring plate to an upright arm 173 fixedly mounted on said H-beam tending to draw said spring plate upwardly. When carriage 35 rides onto said plate it is thus resiliently retained from leaving the same.

As shown in FIG. 9, the "Zero-Max" drive 14 includes an imput shaft 174 connected to motor 15 for being rotated thereby and an eccentric 175 is fixedly connected to said input shaft and is rotatably mounted on connecting rod 176. A pin 177 pivotally connects one end of a pair of speed control links 178 and a main link 182 to connecting rod 176. A pin 179 pivotally connects said speed control links to a lever 180 which is fixedly connected to the axle 181 of control lever 16 pivotally supported on the "Zero-Max" drive 14. Main link 182 has an angular portion 183 pivotally connected by pin 184 to wedge ring 185 and said wedge ring has a roller carrier 186 rotatably mounted thereon with rollers 187 in wedge shaped openings 188 and spring 17 tend to push said rollers to the small end of said wedge openings 188. Output shaft 189 is fixedly connected to said wedge ring and to pulley 13.

Foot pedal 190 is pivotally mounted on fixed base 191 and is connected to cable 112 which runs over pulleys 192 and 193 to bar 106.

A manual control bar 194 is connected to cable 195 in housing 30 which cable 195 runs over pulley 196 to solenoid 197 at one end and has a projection 198 at its other end for engaging and operating a snap-lock switch 199. Said bar 194 slides into housing 31. When bar 194 is manually pushed to the left of FIG. 1, it closes the contacts of switch 199 starting the head 41 to rotate and the carriage 35 to move, while movement of said bar to the right at any time will stop the machine.

Rails 11 have electrical switches 200, 201 and 202 mounted therealong for being engaged and operated by slide plate 27. Switch 200 is a starting switch for motor 15, switch 201 is a stopping switch for motor 15, and switch 202 is a safety switch for stopping motor 15 and head 41.

The operation of the present machine will now be described as used in the production of wire reinforced hose, but it is to be appreciated the machine can equally as well be used for other types of wrapping and winding operations.

A mandrel 40 before being mounted on the machine is inserted into a tube of a resilient material A, such as rubber, and thereafter mounted on the machine by inserting tail center cone 100 in one end of said mandrel and head cone 88 in the other end thereof. Said tail center is moved to the left of FIG. 1 until the mandrel is firmly engaged and disc 105 is in one of the teeth 107 of bar 106 so that it is impossible for said mandrel to be removed from said cones accidentally.

Reel 3 containing a roll of wire 4, has its axle placed on rollers 2 for being rotatably supported and wire 4 is fed over pulley 13, around multiple groove pulleys 29 and 28 and from pulley 29 to pulleys 33 and 34 onto the right of roller 148, left of roller 149, and under roller 150 of the caster making about a 90° bend and from there to and under projection 96 of head 41. For the latter purpose lever 94 is raised by pressing on ring 97 compressing springs 98 till the end of the wire 4 is on key 92 whereupon said lever is freed with springs 98 pressing projection 96 on wire 4 against said key holding the wire end.

When fastening said wire end, carriage 35 is on spring plate 168 depressing the same against spring 172 so that said carriage is restrained from movement.

Figure 1:
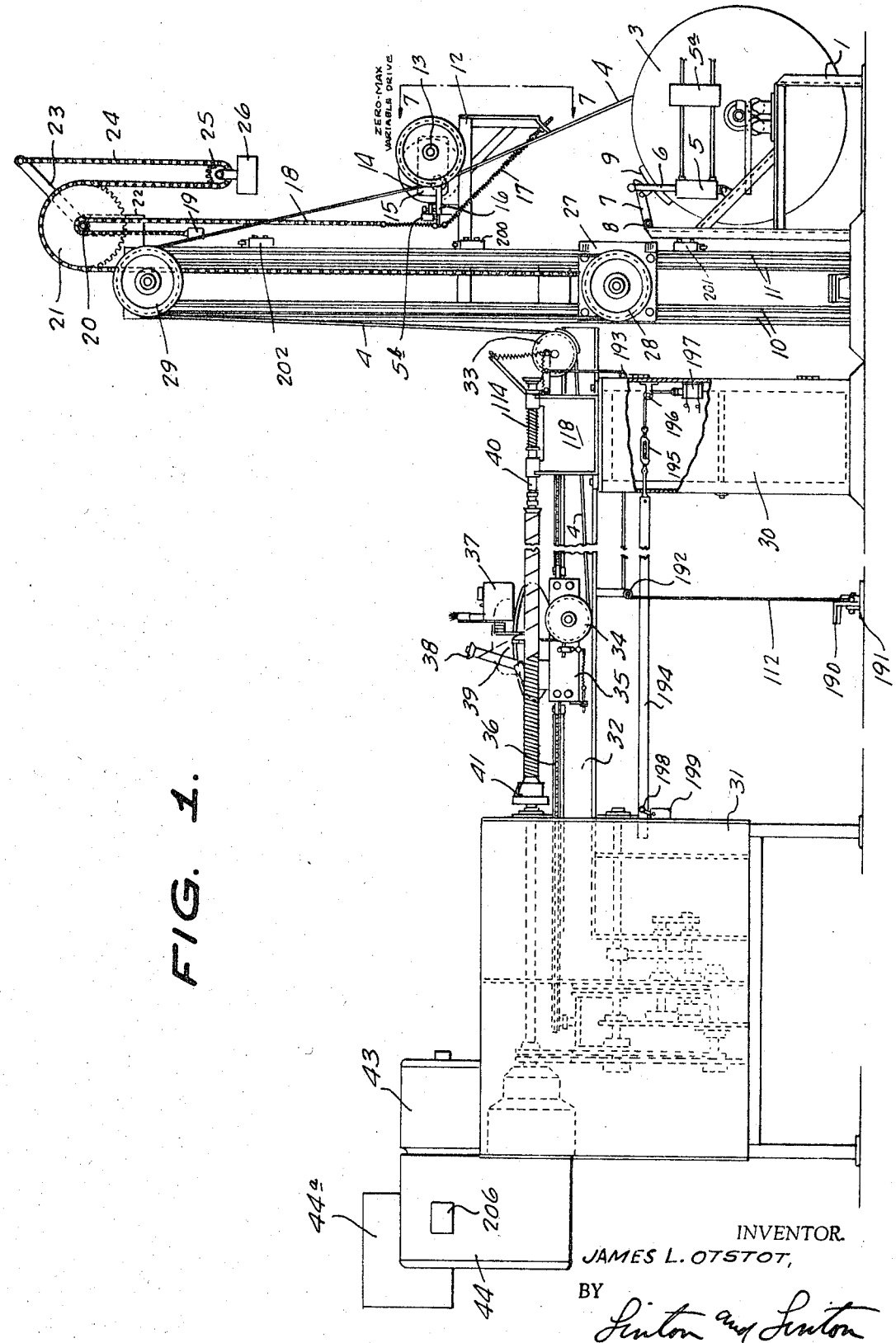
FIG. 1 is a front elevation of the present machine.

Putting switch 206 in its closed position starts the Reeves Motor Drive 43, 44 which runs continuously during the use of the machine. With carriage 35 on spring plate 168, said carriage has pushed slide 156 against spring 157 and toward bearing 158 moving rod 152 to the right of FIG. 4 throwing lever 161 to the right connecting electric clutch 46 to the electrical circuit causing said normally open clutch to engage driving shaft 47, and head 41 rotating said mandrel. The operator operates switch 204 to select either clutch 60 or 67 depending on the speed he desires for carriage 35. Clutch 60 will engage, if selected, driving chain 61 and miter box 62, sprocket 63 and thus chain 36 moving carriage 35 along said rotating mandrel 42 whereupon wire 4 will be coiled along tube A as shown in FIGS. 1 and 4. As said carriage moves along said tube liquid container 37 is pivoted placing brush 121 on said tube placing a liquid, such as a solvent, on the outside of the tube which solvent removes dust and other foreign matter while producing a tacky surface on said tube.

When carriage 35 reaches slide 155 it starts to push said slide against spring 154 which compresses and then pushes disc 153 against bearing 151 moving rod 152 to the left of FIG. 4, moving lever 161 to the left whereupon switch 162 releases clutch 46 and engages clutch 54 which rotates chains 51 giving a slower rotation to head 41. Also switch 162 then opens clutch 60 and engages either clutch 77 or 81 giving a reverse drive to miter box 62 through chains 78 or 79. Rod 152 at the same time by cam 160 moves control lever 163 tripping the time delay switch 165 which energizes solenoid 197 and relay R-6. Solenoid 197 then pulls bar 194 to the right of FIG. 1 tripping switch 199 stopping the machine and relay R-6 closes brake 49 stopping the mandrel rotation. When said time delay switch 165 times out in about two seconds, for example, the circuit is open.

The operator then cuts the wire 4 between the caster roller 150 and tube A and feeds tape 39, for example, a nylon tape, from roller 126 around tape guide 39a to and around tube A, and wire 4 thereon adjacent tail center 40. The operator then moves bar 194 to the left of FIG. 1 closing the circuit whereupon said mandrel again starts rotating drawing tape 39 therearound as shown in FIG. 1 at the proper angle to provide a uniform spiral lap of the edges of said tape while carriage 35 is drawn by chain 36 to the left of FIG. 1 until again said carriage trips tubular slide 155 moving rod 152 and levers 161 and 163 to the right of FIG. 4 and is retained by spring plate 168.

Ring 97 is then pressed downwardly by the operator to release wire 4 and also pedal 190 is depressed pulling bar 106 from disc 105 so that cone 100 can be slid from the mandrel and thus tube A with coiled wire and tape can be removed from the mandrel, as a wire reinforced hose.

It is to be appreciated the sprockets in housing 31 are sized to give various desired speeds to head 41 and chain 36 to obtain uniform pitches to the wire and tape, but different pitches by using one of the clutches 60 or 67 for winding the wire and one of the clutches 77 or 81 for wrapping the tape. Shafts 75 and 68 with their elements can be eliminated or additional similar shafts and elements employed to reduce or increase speed variations available.

At the start, the operator closes either switch 204 for either clutch 60 or 67 and switch 205 for either clutch 77 or 81 and thereafter switch 162 is automatically operated to energize the proper clutch selected as well as clutch 46 or 54.

In FIG. 16 elements R1 through R6 are relays while CT1 and CT2 are clutch controls.

The speed of head 41 can be varied also at any time by operating a conventional "Electric Remote Control Unit" 44a on the Reeves Motor Drive 44, at the desired speed.

As wire 4 is drawn from reel 3, slide plate 27 slides on rails 10 and 11 maintaining the wire at the proper tension. Should plate 27 trip switch 201 the motor 15 will be stopped and if plate 27 trips safety switch 202 it will stop motor 15 and head 41.

The movement of plate 27 also is translated to control lever 16 by chains 24 and 18 controlling the "Zero-Max" drive 14. Referring to FIG. 9 the turning input shaft 174 turns eccentric 175 causing the connecting rod 176 and the control links 178 and main link 182 to move up and down or back and forth depending upon the position of said control link as determined by lever 16 and link 180.

At the zero setting, the connecting rod 176 moves control links 178 and main link 182 up and down through an arc at pin 177 leaving pin 184 stationary. As pin 179 is moved along a vertical arc to the position in FIG. 9 by lever 16, output shaft 189 starts to rotate because connecting rod 176 is now giving back and forth motion to main link 182 and wedge body 185 at pin 184 as indicated by the arrows. This back and forth motion of wedge body 185 turns output shaft 189 because rollers are wedged in wedge slots 188 in one direction of said wedge body movement and freed in the opposite direction providing a free wheeling effect. Thus, output shaft 189 is rotated in varying amounts determined by the position of lever 16 and control link 178 at pin 179. Thus shaft 189 is given a speed from zero to variable output speeds to ensure the proper draw off speed of wire 4 on pulley 13.

Solenoid 5a is energized by micro-switch 5b being opened and closed by the movement of arm 16 and when arm 16 is raised to its horizontal position switch 5b is closed causing brakes 9 to be applied. As soon as arm 16 starts to move away from this horizontal position, switch 5b is opened releasing brakes 9 and starts the output rotation of the "Zero-Max" drive 14 to pick up. The operation of solenoid 5a sends air to the top of cylinder 5 applying brakes 9 to reel 3 stopping the same.

The present machine is capable of considerable modification and such changes thereto as come within the scope of the appended claims is deemed a part of the invention.

I claim:

1. A tailstock comprising a tubular bearing, a member slideably mounted through said bearing, a tail center detachably mounted in said member at one end thereof, an annular pawl carried by said member extending laterally thereof, a toothed bar pivotally connected to said bearing and positioned for at times receiving said pawl in one of said teeth preventing movement of said tail center towards said bearing, resilient means tending to hold said bar in engagement with said pawl and means for moving said bar from said pawl.

References Cited

UNITED STATES PATENTS

| | | | |
|---|---|---|---|
| 314,574 | 3/1885 | Hadley | 82—31 |
| 2,382,896 | 8/1945 | Medcoff | 142—53X |

LEONIDAS VLACHOS, Primary Examiner